Patented Aug. 22, 1950

2,519,650

UNITED STATES PATENT OFFICE 2,519,650

BATTERY-CHARGING SYSTEM, INCLUDING ALTERNATING CURRENT DYNAMO WITH REGULATOR AND RECTIFIER

Ralph Frederic Gilbert Hamilton, London, England, assignor to Rotax Limited, London, England Application May 14, 1948, Serial No. 27,059
In Great Britain May 22, 1947

6 Claims. (Cl. 320—32)

1

This invention has for its object to provide improved means for regulating an alternating current dynamo required to supply direct current to a storage battery and a load circuit through a rectifier. A further object is to provide means for controlling the field current of the dynamo, so as to afford a constant voltage output from the rectifier when the load and speed are both varied widely.

The invention comprises the combination of a field-regulating choke, a winding for varying the impedance of the choke, a resistance in series with the said winding, and means responsive to the battery voltage for varying the resistance.

A known form of alternating current dynamo adapted for use under widely varying speed and load conditions, as on a motor vehicle, comprises a rotary field system, and a stationary three-phase generating system. The generating system is connected to a storage battery and load circuit through a rectifier, and the field system is supplied through a rectifier or rectifiers with current, in part, from a series transformer and in part through a regulating means, or it may be supplied wholly through a regulating means.

Figure 1:
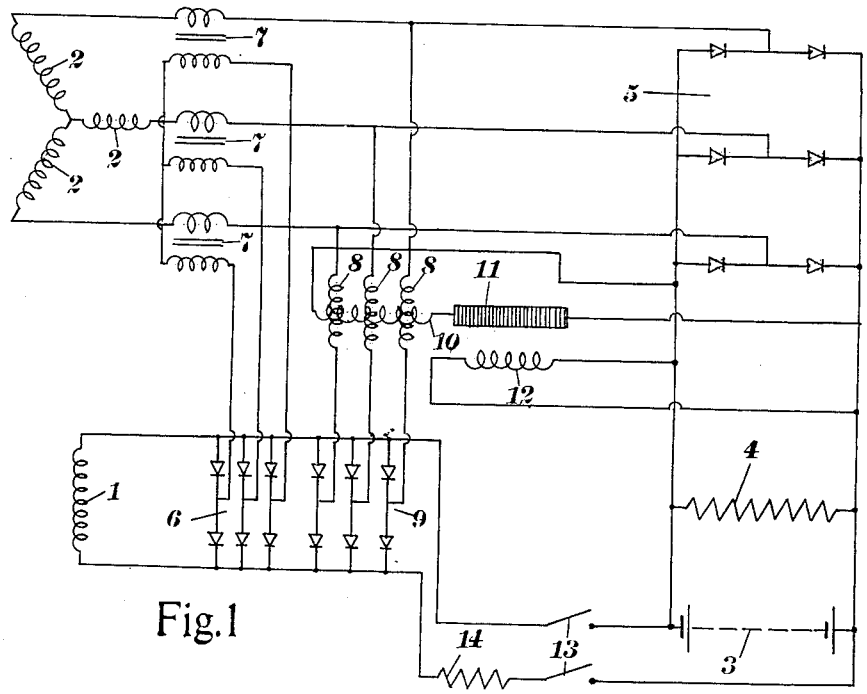
Figure 1 is a diagram of connections of a regulating system arranged and constructed in accordance with the invention.

In carrying the invention into effect according to one convenient mode as illustrated in Figure 1, the dynamo has a rotary field 1 and a stationary three-phase generating winding 2. The latter is connected to the storage battery 3 and a load circuit 4 through a rectifier 5. The field winding 1 is supplied with current, in part, through a rectifier 6 from a series transformer 7 in the circuit of the generating windings 2. A regulating means is provided comprising a three-phase choke consisting of an iron core and three windings 8, the latter being connected at one end to the respective phases of the generating winding 2 and at the other through a rectifier 9 to the field system 1. The iron core also carries an additional winding 10 for varying the impedance of the choke, and this winding is connected in series with a carbon-pile resistance 11. The said winding 10 and resistance 11 is connected across the battery as shown in the drawing. The pile is loaded by a spring which is arranged to compress the pile and the action of the spring is opposed by an electro-magnet 12 which is connected across the battery, so that the resistance

2 of the pile is variable in response to variations in the battery voltage. The field winding 1 may also be energised from the battery when required by a circuit controlled by a switch 13 and including a resistance 14.

The regulating means above described serves to effect variable excitation of the field system in a manner which is appropriately related to variations of the battery voltage, which variations in turn depend on the speed of the dynamo, or the amount of the load, or both. When the battery voltage is low the resistance of the pile 11 is correspondingly low and the magnetising action of the now relatively high current in the additional winding 10 correspondingly diminishes the impedance of the choke, thus enabling a relatively large current to be supplied from the generating system to the field system. With increasing battery voltage, the resistance of the pile 11 is increased, causing a diminution of the current in the additional winding 10 and consequent increase of the choke impedance, with corresponding reduction of the field current. It may be noted that the variation in resistance of the pile 11 is only such as is needed to produce the required variation of control current, and is unaffected by the voltage across the dynamo field.

Figure 2:
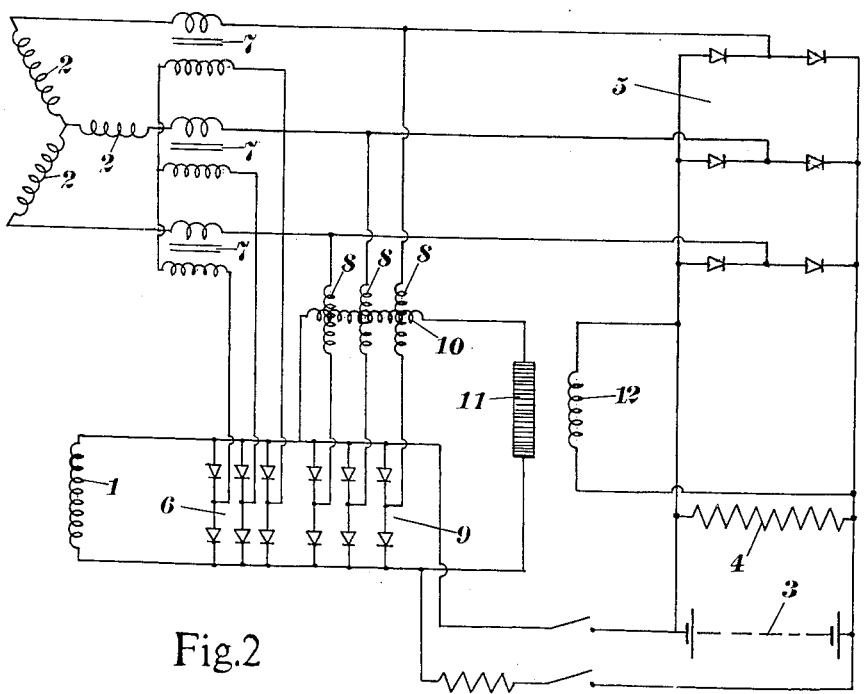
Figures 2, 3 and 4 are diagrams of modified systems.

In the modified arrangement illustrated in Figure 2, the dynamo field winding 1 and the generator winding 2 are connected as in the previous example respectively to the battery 3 and load circuit 4 through the rectifier 5 and to the rectifier 6 which is fed from the transformer 7. The choke windings 8 are connected between the generating winding 2 and the rectifier 9. The additional winding 10 which controls the choke and the carbon-pile resistance 11 are connected across the dynamo field 1, the magnet 12 being connected across the battery. With this arrangement the voltage applied to the additional winding 10 will vary with the field current, and thus the necessary variation of the pile 11 may be reduced as compared with the previously described arrangement. The amount of series excitation provided by the rectifier 6 may be reduced or omitted if desired.

Figure 3:
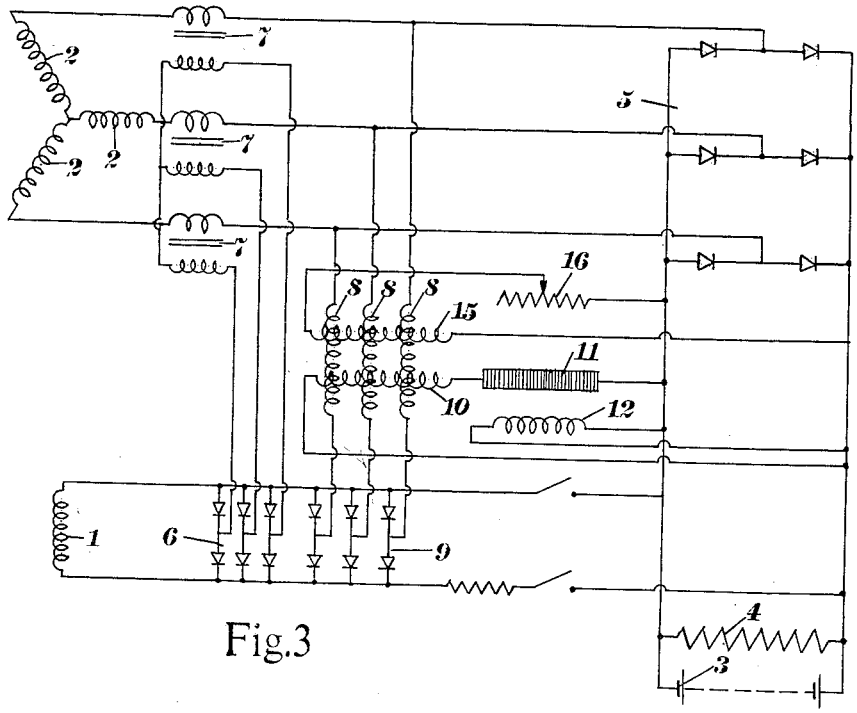

In the modified arrangement illustrated in Figure 3, the dynamo field winding 1 and the generator winding 2 are connected, as in the example illustrated in Figure 1, respectively to the battery 3 and load circuit 4 through the rectifier 5 and to the rectifier 6 which is fed from the transformer 7. The choke windings 8 are connected between the generating winding 2 and the rectifier 9. The additional winding 10 which controls the choke and the carbon-pile resistance 11 are connected across the battery, as also is the magnet 12. In order to enable the characteristics of the regulating means to be varied, a bias winding 15 is mounted on the core in addition to the controlling winding 10. This bias winding is connected across the battery through an adjustable resistance 16 and is arranged to oppose the action of the controlling winding 10. Thus in order to give the same regulating effect the current in the controlling winding must be increased at all times by an amount sufficient to eliminate the effect of the current in the bias winding. In this way the required range of the carbon-pile resistance may be reduced.

Figure 4:
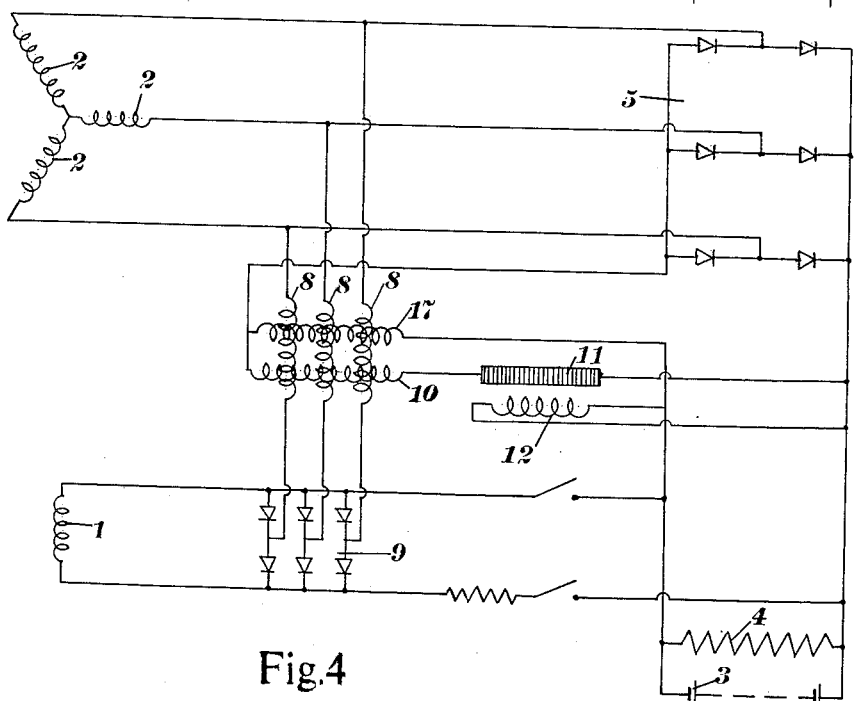

In the above described examples the regulating means is used in arrangements where the field system of the dynamo is supplied in part through a series transformer and rectifier. In the modified arrangement illustrated in Figure 4, the whole of the field current is supplied by the regulating means, the series transformer and associated rectifier being omitted. The field winding 1 is supplied from the rectifier 9 which is fed from the choke windings 8 connected to the generating windings 2 which are connected through the rectifier 5 to the battery 3 and load circuit 4. The controlling winding 10 of the chokes 8 is connected through a carbon-pile resistance 11 across the battery terminals and the resistance is varied by a magnet 12 as in the previous examples. In addition to the controlling winding 10 the variable choke is provided with a compounding winding 17 which is connected in series with the battery 3 between the latter and the rectifier 5, the direction of current in the winding 17 being such as to assist the controlling winding 10. This arrangement gives a simpler circuit and the weight of the equipment is reduced.

By appropriate design of the regulating means above described the dynamo can be closely regulated over a wide range of variation of speed and load conditions.

Having thus described my invention what I claim as new and desire to secure by Letters Patent is:

1. In an electric current supply system having an alternating current dynamo, a storage battery, a load circuit, and rectifying means through which direct current is supplied by the dynamo to said storage battery and load circuit, dynamo regulating means comprising a dynamo field regulating choke, a winding for varying the impedance of said choke, a resistance in series with said winding, and means responsive to the voltage of said battery for varying said resistance.

2. An electric current supply system according to claim 1, in which the winding for varying the impedance of the choke is connected across the battery.

3. An electric current supply system according to claim 1, in which the dynamo is provided with a field system across which is connected the winding for varying the impedance of the choke.

4. In an electric current supply system having an alternating current dynamo, a storage battery, a load circuit, and rectifying means through which direct current is supplied by the dynamo to said storage battery and load circuit, dynamo regulating means comprising a dynamo field regulating choke, a winding connected across said battery and arranged to vary the impedance of said choke, a second winding also connected across said battery and arranged to oppose the first winding, a resistance in series with said first winding, and means responsive to the voltage of said battery for varying said resistance.

5. An electric current supply system according to claim 4 and having an adjustable resistance in series with the second winding.

6. An electric current supply system according to claim 1 and having in combination with the choke and winding, a compounding winding in series with the battery and arranged to assist the first mentioned winding for varying the impedance of the choke.

RALPH FREDERIC GILBERT HAMILTON.

REFERENCES CITED

The following references are of record in the file of this patent:

UNITED STATES PATENTS

| Number | Name | Date |
| --- | --- | --- |
| 1,204,160 | Jepson | Nov. 7, 1916 |
| 1,710,755 | West | Apr. 30, 1929 |
| 1,985,004 | West | Dec. 18, 1934 |
| 2,102,141 | Wagar | Dec. 14, 1937 |
| 2,134,880 | McDowell et al. | Nov. 1, 1938 |
| 2,140,349 | Dawson | Dec. 13, 1938 |
| 2,179,299 | Murcek | Nov. 7, 1939 |
| 2,235,330 | Pugh | Mar. 18, 1941 |
| 2,306,998 | Claesson | Dec. 29, 1942 |
| 2,374,012 | Hanna | Apr. 17, 1945 |
| 2,383,722 | Haug | Aug. 28, 1945 |